(No Model.)
J. A. SCARBOROUGH.
AXLE LUBRICATOR.
No. 460,833. Patented Oct. 6, 1891.
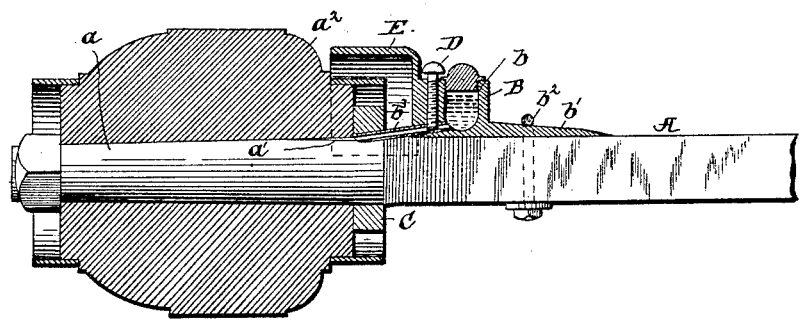
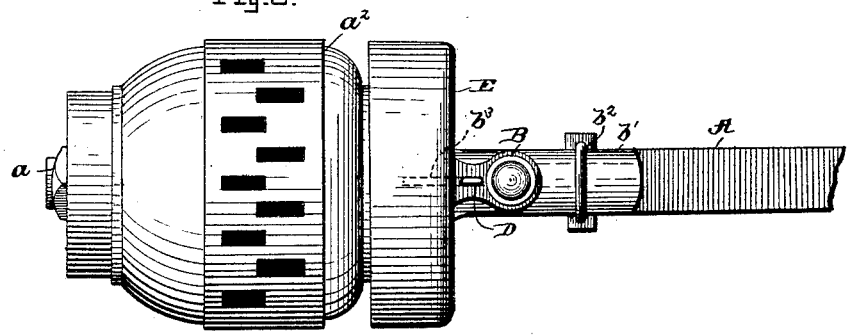
WITNESSES
Thos. S. Hodges
D. A. Millrick
INVENTOR
J. A. SCARBOROUGH
By Patrick O'Farrell.
Attorney.
THE NORRIS PETERS CO., PHOTO-LITHO., WASHINGTON, D. C.

UNITED STATES PATENT OFFICE.

JAMES ALLEN SCARBOROUGH, OF SILVER CREEK, MISSISSIPPI.

AXLE-LUBRICATOR.

SPECIFICATION forming part of Letters Patent No. 460,833, dated October 6, 1891.

Application filed March 14, 1891. Serial No. 385,072. (No model.)

*To all whom it may concern:*

Be it known that I, JAMES ALLEN SCARBOROUGH, a citizen of the United States of America, residing at Silver Creek, in the county of Lawrence and State of Mississippi, have invented certain new and useful Improvements in Axle-Lubricators, &c., of which the following is a specification, reference being had therein to the accompanying drawings.

This invention pertains to a new and improved axle-lubricator and sand-band; and it has for its object the production of a cheap, simple, and highly-efficient means for protecting the hub of a vehicle-wheel from the entrance of sand, and also for readily and easily lubricating the axle-skein.

The invention also comprises an oil cup or reservoir having a ring or washer, a channel, a screw for regulating the flow of oil through said channel, and a sand-band projecting from said oil-cup, substantially as hereinafter fully set forth, and particularly pointed out in the claims.

In the accompanying drawings, Figure 1 is a vertical longitudinal sectional view illustrative of my invention. Fig. 2 is a top plan view thereof.

Referring to the drawings, A designates an axle, $a$ the axle-skein having a groove or recess $a''$, and, $a^2$ a wheel-hub.

B is the oil cup or reservoir having a vertical circular chamber $b$ and a lower flange $b'$, over which is passed a clip $b^2$ for holding said cup tight down on axle A. A ring C is secured to or formed with the outer end of flange $b'$, and through it and said flange passes a channel or recess $b^3$, leading from the lower end of chamber $b$.

D is a thumb-screw working in a vertical aperture formed adjacent to chamber $b$ and having its lower end extended into channel or recess $b^3$, whereby the flow of oil or lubricant can be regulated by adjusting said screw.

E is a curved band or flange projecting from the oil cup or reservoir and designed to project over and encompass the upper half of the wheel-hub, and thereby prevent sand from falling in between the hub and axle-skein.

In practice the oil cup or reservoir is so secured upon the axle that the ring C will serve to limit the inward movement of the wheel, and the oil channel or recess is made to coincide with the groove or recess $a'$, so that the oil or other lubricant can be readily supplied to the wheel.

From the foregoing description it will be seen that I have produced an extremely simple and cheap device by which a lubricant can be readily applied to a wheel or axle therefor, and at the same time sand or the like is prevented from getting onto the axle-skein.

The device is composed of but few parts, and hence is not liable to readily get out of order or become deranged.

I claim as my invention—

1. The herein-described improved axle-lubricator and sand-band, comprising the oil cup or reservoir having a channel or recess, the oil-supply-regulating screw having its lower end extended into said channel or recess, and the flange or band projecting from said cup or reservoir and inclosing the upper half of the wheel-hub, substantially as set forth.

2. The herein-described improved axle-lubricator, comprising the oil cup or reservoir, the flange or plate projecting therefrom, the ring secured to said flange or plate, the oil channel or recess extending from said oil cup or reservoir and opening onto the axle-skein, the oil-supply-regulating screw, and the securing-clip, substantially as set forth.

3. The herein-described combined axle-lubricator and sand-band, comprising the oil cup or reservoir, the flange or plate, the ring, the oil channel or recess, the thumb-screw, the band or flange projecting from said cup or reservoir, and the securing-clip, substantially as set forth.

In testimony whereof I affix my signature in presence of two witnesses.

JAMES ALLEN SCARBOROUGH.

Witnesses:
 J. D. DAMPEER,
 E. H. THOMPSON.